(12) United States Patent
Osborn et al.

(10) Patent No.: US 11,742,894 B2
(45) Date of Patent: *Aug. 29, 2023

(54) TECHNIQUES TO REDUCE POWER CONSUMPTION IN NEAR FIELD COMMUNICATION SYSTEMS

(71) Applicant: Capital One Services, LLC, McLean, VA (US)

(72) Inventors: Kevin Osborn, Newton, MA (US); David Wurmfeld, Falls Church, VA (US); Kevan Emmott, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,347

(22) Filed: Jan. 25, 2022

(65) Prior Publication Data

US 2022/0255585 A1 Aug. 11, 2022

Related U.S. Application Data

(63) Continuation of application No. 16/822,956, filed on Mar. 18, 2020, now Pat. No. 11,271,609, which is a (Continued)

(51) Int. Cl.
*H04B 5/00* (2006.01)
*H04W 4/80* (2018.01)
(Continued)

(52) U.S. Cl.
CPC ......... *H04B 5/0025* (2013.01); *G06K 7/0008* (2013.01); *G06K 19/0723* (2013.01); (Continued)

(58) Field of Classification Search
CPC ...... H04B 5/0025; H04B 5/0062; H04B 5/02; H04B 5/0031; H04B 5/0037; H04B 1/005;
(Continued)

(56) References Cited

U.S. PATENT DOCUMENTS 8,718,546 B2 * 5/2014 Walker .............. H04W 52/0258
455/566
10,325,464 B1 * 6/2019 Trivelpiece ............ G07G 1/009
(Continued)

FOREIGN PATENT DOCUMENTS

CN 105993132 A 10/2016

*Primary Examiner* — Andrew Wendell
(74) *Attorney, Agent, or Firm* — KDW FIRM PLLC

(57) ABSTRACT

Various embodiments are generally directed to techniques communicate in a cellular communication frequency range, detect a resonant signal in response to the communication in the cellular communication frequency range for cellular communication, the resonant signal to indicate presence of a contactless card. Embodiments also include enabling a near-field communication device to send a communication to the contactless card based on the detection of the resonant signal, the near-field communication device to communicate with the contactless card in a near-field communication frequency range.

17 Claims, 9 Drawing Sheets

Related U.S. Application Data continuation of application No. 16/531,682, filed on Aug. 5, 2019, now Pat. No. 10,630,344, which is a continuation of application No. 16/287,119, filed on Feb. 27, 2019, now Pat. No. 10,425,129.

(51) Int. Cl.
*G06K 19/07* (2006.01)
*H04B 5/02* (2006.01)
*G06K 19/077* (2006.01)
*G06K 7/00* (2006.01)

(52) U.S. Cl.
CPC ..... *G06K 19/07773* (2013.01); *H04B 5/0062* (2013.01); *H04B 5/02* (2013.01)

(58) Field of Classification Search
CPC ............... H04B 5/0056; G06K 7/0008; G06K 19/0723; G06K 19/07773; G06K 7/10128; H04W 4/80
See application file for complete search history.

(56) References Cited

U.S. PATENT DOCUMENTS

| | | | |
|---|---|---|---|
| 10,425,129 B1* | 9/2019 | Osborn | G06K 7/0008 |
| 10,630,344 B1* | 4/2020 | Osborn | G06K 7/10128 |
| 2013/0196594 A1* | 8/2013 | Moosavi | H04M 1/72412 |
| | | | 455/41.1 |
| 2013/0196595 A1* | 8/2013 | Byrne | H04W 52/0251 |
| | | | 455/41.1 |
| 2016/0381200 A1* | 12/2016 | McCleland | H04M 1/72409 |
| | | | 455/422.1 |
| 2017/0093464 A1* | 3/2017 | Karandikar | H04B 5/0056 |
| 2019/0279221 A1* | 9/2019 | Wang | G06Q 20/3226 |
| 2020/0058963 A1* | 2/2020 | Morris | H02J 7/00034 |
| 2021/0192876 A1* | 6/2021 | Tikkanen | G07C 9/00817 |

* cited by examiner

TECHNIQUES TO REDUCE POWER CONSUMPTION IN NEAR FIELD COMMUNICATION SYSTEMS

RELATED APPLICATIONS

This application is a continuation of U.S. patent application Ser. No. 16/822,956 filed on Mar. 18, 2020, which is a continuation of U.S. patent application Ser. No. 16/531,682 (now U.S. Pat. No. 10,630,344) filed on Aug. 5, 2019, which is a continuation of U.S. patent application Ser. No. 16/287,119 (now U.S. Pat. No. 10,425,129) filed on Feb. 27, 2019. The contents of the aforementioned applications are incorporated herein by reference in their entirety.

BACKGROUND

Mobile communication systems continue to grow in popularity and have become an integral part of both personal and business communications. Some mobile devices incorporate contactless card technology and/or Near Field Communication (NFC) chips. NFC technology may be used for contactless short-range communications based on radio frequency identification (RFID) standards, using magnetic field induction to enable communication between electronic devices, including mobile wireless communications devices. These short-range communications may include payment and ticketing, electronic keys, identification, device set-up service, and similar information sharing. However, NFC devices tend to use a lot of power causing users to disable them on the mobile devices to preserve battery life, which limits NFC's potential use.

SUMMARY

Various embodiments described herein may include a device, a system, an apparatus, and so forth including a transceiver to communicate in a first frequency range for cellular communication. The device may also include circuitry coupled with the transceiver, and the circuitry may detect a resonant signal in response to a transmission in the first frequency range for cellular communication In embodiments, the resonant signal may indicate presence of a contactless card, for example. The circuitry may enable a near-field communication device based on the detection of the resonant signal, the near-field communication device to communicate with the contactless card in a second frequency range, which may be different than the first frequency range.

Various embodiments described herein may also include a computer-implemented method, including communicating in a cellular communication frequency range, detecting a resonant signal in response to the communication in the cellular communication frequency range for cellular communication, the resonant signal to indicate presence of a contactless card, and enabling a near-field communication device to send a communication to the contactless card based on the detection of the resonant signal, the near-field communication device to communicate with the contactless card in a near-field communication frequency range.

Various embodiments described herein may include a device, a system, an apparatus, and so forth including a near-field communication device operable to communicate in a near-field communication range, and a resonant circuit responsive to communications in the cellular frequency range, the resonant circuit to oscillate in response to a communication in the cellular frequency range, and wherein the near-field communication device to receive an energizing signal based on the resonant circuit oscillating and communicate with another near-field communication device of a device.

DETAILED DESCRIPTION

Figure 1A:
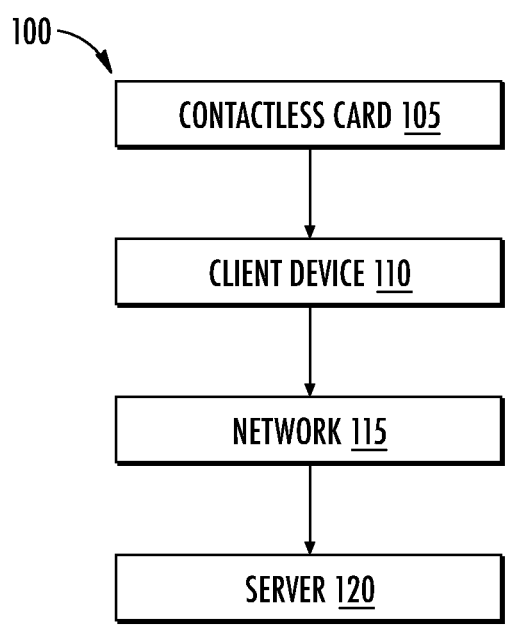
FIG. 1A is a diagram of a data transmission system according to an example embodiment.

Various embodiments are generally directed to minimizing power usage for client devices using near-field communication (NFC) devices by reducing the amount of time the client devices spend searching for other devices for which to communicate. For example, embodiments include keeping an NFC device in an off or lower power state until another device is detected based on a resonant frequency signal detection.

More specifically, a client device, such as a mobile phone, may communicate in a normal course of operation cellular communications with a cellular system. These cellular communications may include voice communications, data communications, status communication, and so forth in a cellular frequency range. Another device, such as a contactless card, may include resonant circuit that is tuned to resonant when in the presence of a cellular communication communicated in the cellular frequency range. The client device may include circuitry capable of detecting the resonant frequency signal emitted by the contactless card. In response to detecting the resonant frequency signal, the client device may enable its' NFC device and attempt to communicate with the contactless card using NFC.

The features and techniques discussed herein are improvements over prior systems because they enable a device to utilize a considerable amount of less power. Prior NFC solutions required a user to keep an NFC device enabled on the client device until the other device, such as a credit card or payment system, was detected. This approach consistently requires the NFC device to poll or ping (energize) to make a connection attempt using power and draining a battery. Alternatively, a user could disable the NFC device until they are ready to couple with another device. However, this approach requires a user to manually enable the NFC device every time they want to use it, which is inconvenient. Embodiments discussed keep the NFC device in an off or lower power utilization state and automatically turn on when another device is present. Thus, this approach uses less power and is convenient to the user. These and other details will become more apparent in the following description.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates a data transmission system according to an example embodiment. As further discussed below, system 100 may include contactless card 105, client device 110, network 115, and server 120. Although FIG. 1A illustrates single instances of the components; system 100 may include any number of components.

System 100 may include one or more contactless cards 105, which are further explained below with reference to FIGS. 2A-2B. In some embodiments, contactless card 105 may be in wireless communication, utilizing Near Field Communication (NFC) in an example, with client device 110.

System 100 may include client device 110, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 110 can include components including a processor and a memory, and it is understood that the processing circuitry may contain additional components, including processors, memories, error and parity/CRC checkers, data encoders, anticollision algorithms, controllers, command decoders, security primitives, and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In embodiments, the client device 110 may include one or more input/output (I/O) devices including those to communicate using wireless and wired technologies. For example, the client device 110 may include one or more transceivers to communicate in a cellular frequency band, e.g., a 700 Megahertz (MHz) frequency range, a 800 Megahertz (MHz) frequency range, a 850 MHz frequency range, a 1700 MHz frequency range, a 1900 MHz frequency range, a 2100 MHz frequency range, a 2300 MHz frequency range, a 2500 MHz frequency range, a 2600 MHz frequency range, and so forth. The transceiver itself may include components and circuitry to perform transmitting and receiving operations. The components and circuitry include analog-to-digital converters, digital-to-analog converters, modulators, amplifiers, and so forth. In embodiments, the transceiver may be coupled with one or more antennas to perform communications. Moreover, the transceiver may include and/or be coupled with additional physical layer and Medium Access Control (MAC) layer circuitry and software to communicate in accordance with one or more cellular standards, such as the $2^{nd}$ generation (2G), 3G, 4G, and 5G or New Radio (NR) standards. Additional cellular standards and/or techniques include Enhanced Data rates for GSM Evolution (EDGE), Evolution-Data Optimized (EVDO), General Packet Radio Service (GPRS), High Speed Packet Access (HSPA), Evolved HSPA (HSPA+), Long-Term Evolution (LTE), Universal Mobile Telecommunications System (UMTS), Worldwide Interoperability for Microwave Access (WiMAX), etc. The transceiver may utilize one or more radio technologies and protocols (cellular protocols), e.g., Code-division multiple access (CDMA), frequency-division duplexing (FDD), time-division duplexing (TDD), multiple-input and multiple-output (MIMO), Orthogonal frequency-division multiple access (OFDMA), and so forth. Embodiments are not limited in this manner.

In embodiments, the client device 110 may include additional I/O devices, such as an NFC device coupled with an NFC antenna, e.g., a loop antenna. The NFC device may be a radio/controller operable to communicate in accordance with the NFC protocol and to employ electromagnetic induction via the NFC antenna. In one example, the NFC device may communicate in the unlicensed radio frequency Industrial, Scientific, and Medical (ISM) band of 13.56 MHz on International Organization for Standardization/International Electrotechnical Commission (ISO/IEC) 18000-3 air interface achieving data rates from 106 to 424 kilobits/second (kbit/s). As will be discussed in more detail below, the NFC device may be employed and provided via an application to communicate with another NFC enabled device, e.g., a contactless card 105.

In one example, the client device 110 including an NFC device may operate as an initiator and the contactless card 105 may operate as a target. In this example, the client device 110 and the contactless card 105 may operate in a passive mode of operation. The client device 110 operating as the initiator energizes and provides a carrier field for the contactless card 105 operating as the target. The contactless card 105 draws its operating power from the initiator-provided electromagnetic field. In prior solutions, the client device 110 including the NFC device may continuously and periodically (or semi-periodically) search for a target, e.g., the contactless card 105. For client devices 110 that operate on battery power this constant searching for a target uses a considerable amount of power and drains the battery. Thus, users of the client device 110 may disable the NFC device (disable power) and/or put the NFC device into a lower power state such that it does not use as much power. However, the client device 110 may not discover a contactless card 105 and/or a user may be forced to enable the NFC device each time they wish the client device 105 to perform a discovery. Embodiments discussed herein solve these shortcomings by automatically enabling an NFC device based on a detection of a resonant signal caused by a cellular communication. The client device 110 may keep the NFC device in a disabled and/or lower powered mode of operation until a resonant signal is detected saving power and not requiring user action. These and other details will be provided below.

In some examples, client device 110 of system 100 may execute one or more applications, such as software applications, that enable, for example, network communications with one or more components of system 100 and transmit and/or receive data.

Client device 110 may be in communication with one or more servers 120 via one or more networks 115 and may operate as a respective front-end to back-end pair with server 120. Client device 110 may transmit, for example from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network, and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access-based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to the memory. Server 120 may be configured as a central system, server or platform to control and call various data at different times to execute a plurality of workflow actions. Server 120 may be configured to connect to the one or more databases. Server 120 may be connected to at least one client device 110.

Figure 1B:
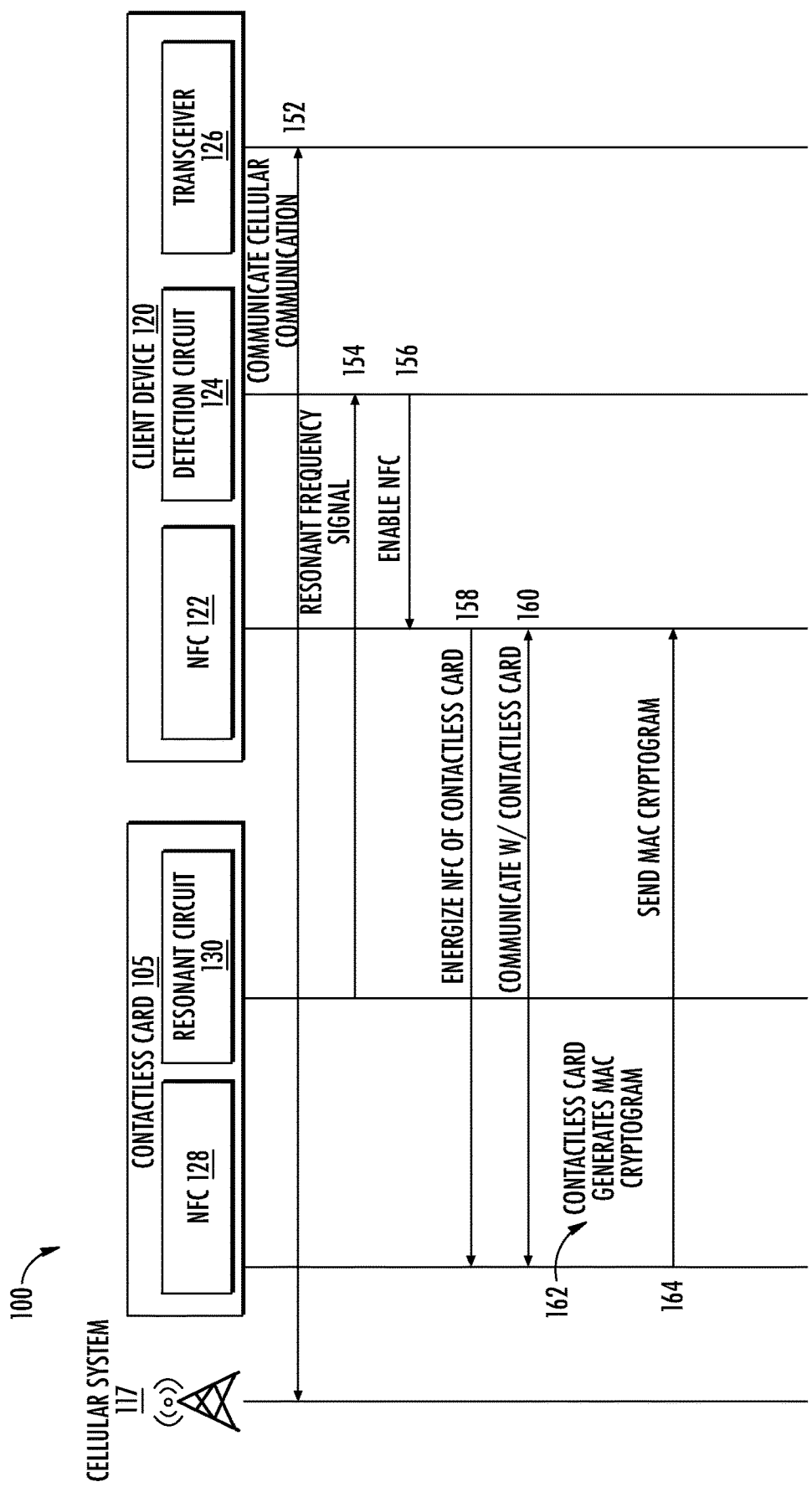
FIG. 1B is a diagram illustrating a sequence for providing authenticated access according to an example embodiment.

FIG. 1B is a timing diagram illustrating an example sequence for performing device discovery for one or more embodiments of the present disclosure. System 100 includes a contactless card 105, a client device 110, and a cellular system 117. The cellular system 117 may include a number of components and systems to communicate in accordance with one or more the cellular standards and protocols. The contactless card 105 may include an NFC device 128 and a resonant circuit 130, and the client device 110 may include an NFC device 122, a detection circuit 124, and transceiver 126. In instances, the contactless card 105 and/or the client device 110 may include additional components to perform operations. For example, the client device 110 may include a processor, a memory, interfaces, and so forth, as previously discussed. In embodiments, the client device 110 may include a storage to store one or more applications. Moreover, one or more of the components, e.g., NFC device, detection circuit 124, the transceiver 126, etc. may be implemented in hardware as physical circuitry and/or software stored in a memory to perform one or more of the operations discussed herein.

The device discovery operation may include a client device 110 communicating a cellular communication and the contactless card 105 including a resonant circuit 130 configured to respond to the cellular communication. The resonant circuit 130 may cause a resonant signal in response to the cellular communication to cause enablement of the NFC device 122.

More specifically and at step 152, the client device 110 may cause a transceiver 126 to communicate a cellular communication with a cellular system 117. The cellular communication may be any type of cellular communication, e.g., a voice communication, a data communication, a configuration communication, a polling communication, a setup/configuration communication, and so forth. Note that in some instances, the cellular communication may be communicated by the cellular system 117 and received by the transceiver 126 of the client device 110. Embodiments are not limited in the direction of the communication of the cellular communication.

At step 154, a resonant circuit 130 of a contactless card 105 may react in response to the cellular communication. The resonant circuit 130 may be an LC circuit including an inductor and a capacitor that is configured to operate as an electrical resonator in response to the cellular communication in one or more cellular frequency range(s). The resonant circuit 130 reacts by oscillating with minimal damping in response to cellular communication, for example.

Also at step 154, the detection circuit 124 of the client device 110 may detect the resonant signal. For example, the detection circuit 124 may detect a load on an amplifier of the transceiver 126 and/or coupled with the transceiver 126. In some instances, the detection circuit 124 may detect the presence of the resonant circuit and resonant signal by measuring the efficiency and/or load of the transmitting antenna. The load may indicate the presence of the resonant signal and the contactless card 105. In one example, the detection circuit 124 may be a physical circuit capable of detecting the load on the amplifier via a wired interconnect or connection. In embodiments, the detection circuit 124 may be a standalone separate circuit or controller and/or may be part of a main processing circuit of the client device 110, e.g., processing unit (CPU). In another example detection circuit, 124 may at least be partially implemented in software stored in memory and receive a signal or communication from the transceiver 126 indicating the load on the amplifier via another application or operating system.

In embodiments, the detection circuit 124 may only detect the presence of the resonant signal when the contactless card 105 is within a distance. For example, the detection circuit 124 may detect a resonant signal approximate to the distance for NFC communication, e.g., within 20 centimeters (cms). However, embodiments are not limited to this example. For example, the detection circuit 124 may detect the resonant signal at a distance greater than the NFC communication capabilities to allow time for the NFC device to enable, e.g., exit an off or lower power state.

At step 156, the client device 110 including the detection circuit 124 may cause enablement of the NFC device 122. In some embodiments, the detection circuit 124 may send a signal directly to the NFC device 122, e.g., through one or more wired interconnects or connections. In other instances, the detection circuit 124 may at least be partially implemented in software and send a signal or communication to an application or the operating system controlling the NFC device 122 to enable the NFC device 122.

In embodiments, the client device 110 may enable the NFC device 122 by causing the NFC device 122 to exit an off or lower power state and enter a higher power state. The NFC device 122 may use no power while in the off state, use minimal power in the lower power state, and normal power in the higher power state. In one example, the NFC device 122 may consume zero current while in the off state, a few milliamps (mA) in the lower power state, and ~100 mA in the higher power state. Thus, as is apparent, leaving the NFC device 122 in an off or lower power state until a contactless card 105 comes in the vicinity of the NFC device 122 uses considerably less power than if the NFC device 122 is in the higher power state (normal operation).

At step 158, the client device 110 including the NFC device 122 may energize or attempt to energize the NFC device 128 of the contactless card 105. For example, the NFC device 122 may provide a carrier field and the NFC device 128 responds by modulating the existing field. Thus, the NFC device 128 may draw its operating power from the NFC device 122 provided electromagnetic field.

Further and at step 160, the client device 110 including an application communicates with the contactless card 105 (e.g., after being brought near the contactless card 105). In embodiments, the client device 110 may perform one or more authentication operations with the contactless card 105. Moreover, communication between the client device 110 and the contactless card 105 may involve the contactless card 105 being sufficiently close to a card reader (not shown) of the client device 110 to enable NFC data transfer between the client device 110 and the contactless card 105.

At step 162, after communication has been established between client device 110 and contactless card 105, the contactless card 105 generates a message authentication code (MAC) cryptogram. In some examples, this may occur when the contactless card 105 is read by the client device 110. In particular, this may occur upon a read, such as an NFC read, of a near-field data exchange (NDEF) tag, which may be created in accordance with the NFC Data Exchange Format.

Figure 2A:
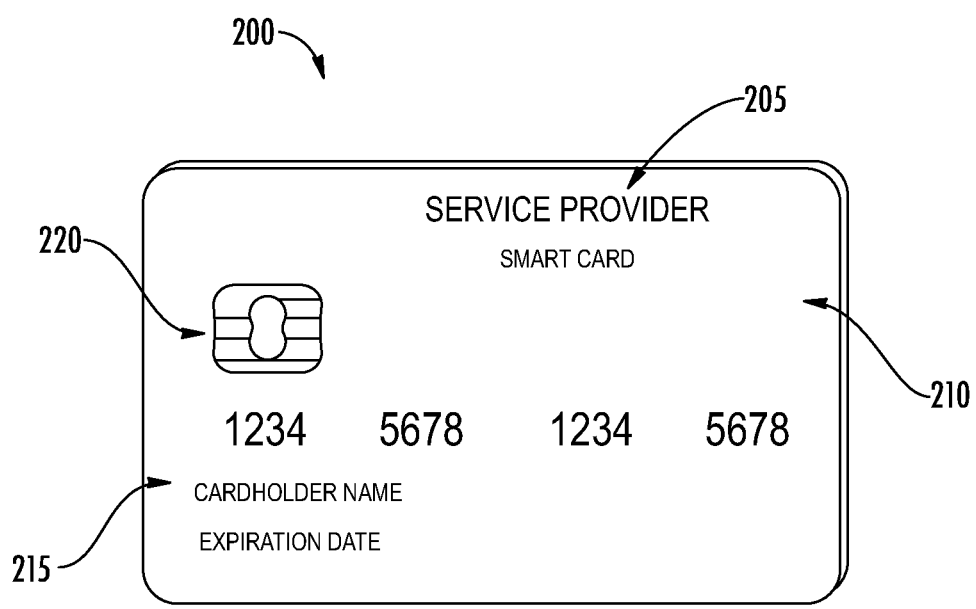
FIG. 2A is an illustration of a contactless card according to an example embodiment.

FIG. 2A illustrates one or more contactless cards 200, which may comprise a payment card, such as a credit card, debit card, or gift card, issued by a service provider 205 displayed on the front or back of the card 200. In some examples, the contactless card 200 is not related to a payment card, and may comprise, without limitation, an identification card. In some examples, the payment card may comprise a dual interface contactless payment card. The contactless card 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, such as a user device, smartphone, laptop, desktop, or tablet computer. The contactless card 200 may also include processing circuitry, antenna and other components not shown in FIG. 2A. These components may be located behind the contact pad 520 or elsewhere on the substrate 210, e.g. within a different layer of the substrate 210. The contactless card 200 may also include a magnetic strip or tape, which may be located on the back of the card (not shown in FIG. 2A).

Figure 2B:
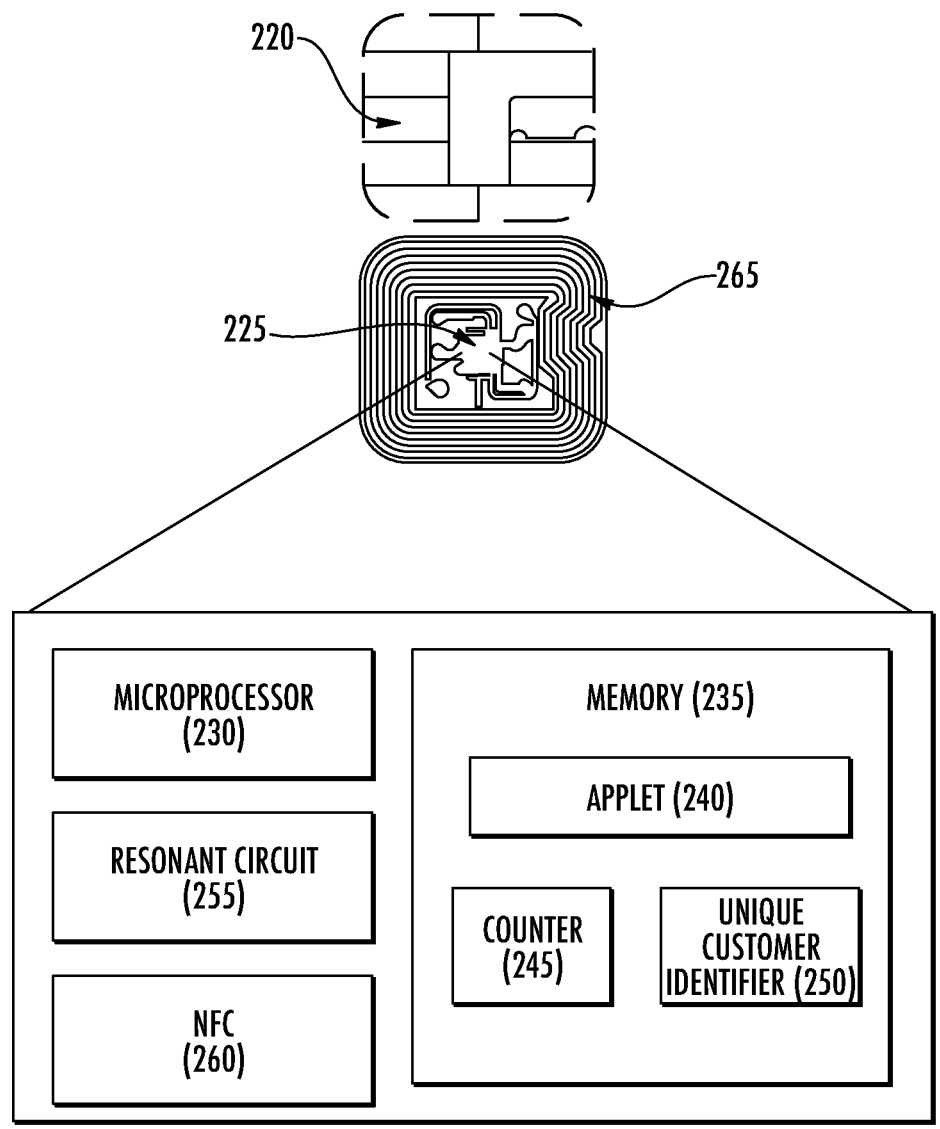
FIG. 2B is an illustration of a contact pad of the contactless card according to an example embodiment.

As illustrated in FIG. 2B, the contact pad 220 of FIG. 2A may include processing circuitry 225 for storing and processing information, including a microprocessor 230 and a memory 235. It is understood that the processing circuitry 225 may contain additional components, including processors, memories, error and parity/CRC checkers, data encoders, anticollision algorithms, controllers, command decoders, security primitives, and tamperproofing hardware, as necessary to perform the functions described herein.

The memory 235 may be a read-only memory, write-once read-multiple memory or read/write memory, e.g., RAM, ROM, and EEPROM, and the contactless card 500 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 235 may be configured to store one or more applets 240, one or more counters 245, and a customer identifier 250. The one or more applets 240 may comprise one or more software applications configured to execute on one or more contactless cards, such as Java Card applet. However, it is understood that applets 240 are not limited to Java Card applets, and instead may be any software application operable on contactless cards or other devices having limited memory. The one or more counters 245 may comprise a numeric counter sufficient to store an integer. The customer identifier 250 may comprise a unique alphanumeric identifier assigned to a user of the contactless card 200, and the identifier may distinguish the user of the contactless card from other contactless card users. In some examples, the customer identifier 250 may identify both a customer and an account assigned to that customer and may further identify the contactless card associated with the customer's account.

In embodiments, the contactless card 200 may include a resonant circuit 255 configured to oscillate in response to cellular communication. As mentioned, the resonant circuit 255 may include an inductor/capacitor (LC) circuit that may react to cellular communication in one or more cellular frequency bands. For example, the resonant circuit 255 may react and emit a resonant signal in response to a cellular communication to/from a client device in one or more cellular frequency bands, e.g., cellular frequency band, e.g., a 700 Megahertz (MHz) frequency range, a 800 Megahertz (MHz) frequency range, a 850 MHz frequency range, a 1700 MHz frequency range, a 1900 MHz frequency range, a 2100 MHz frequency range, a 2300 MHz frequency range, a 2500 MHz frequency range, a 2600 MHz frequency range. The resonant signal may be detected by a detection circuit of the client device and cause the client device to enable an NFC device.

In embodiments, the contactless card 200 may also include an NFC device 260 capable of communicating in accordance with an NFC protocol. The NFC device 260 may operate passively and may be energized by a signal emitted by an NFC device of the client device. The NFC device 260 may draw its power from the electromagnetic field caused by the NFC device of the client device, for example. However, embodiments are not limited in this manner. In another example, the contactless card 200 may be provided with a power source (not shown) operable to supply power to the NFC device 260 such that it can activate its own electromagnetic field.

The components of the contactless card including the resonant circuit, the NFC device, processor and memory elements of the foregoing exemplary embodiments are described and shown with reference to the contact pad, but the present disclosure is not limited thereto. It is understood that these elements may be implemented outside of the pad 220 or entirely separate from it, or as further elements in addition to processor 230 and memory 235 elements located within the contact pad 220.

In some examples, the contactless card 500 may comprise one or more antennas 255. The one or more antennas 255 may be placed within the contactless card 200 and around the processing circuitry 225 of the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225.

In an embodiment, the coil of contactless card 200 may act as the secondary of an air core transformer. The terminal may communicate with the contactless card 200 by cutting power or amplitude modulation. The contactless card 200 may infer the data transmitted from the terminal using the gaps in the contactless card's power connection, which may be functionally maintained through one or more capacitors. The contactless card 200 may communicate back by switching a load on the contactless card's coil or load modulation. Load modulation may be detected in the terminal's coil through interference.

As explained above, the contactless cards 200 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near-field data exchange requests, from a reader, such as a mobile NFC reader, and produce an NDEF message that comprises a cryptographically secure OTP encoded as an NDEF text tag.

Figure 3:
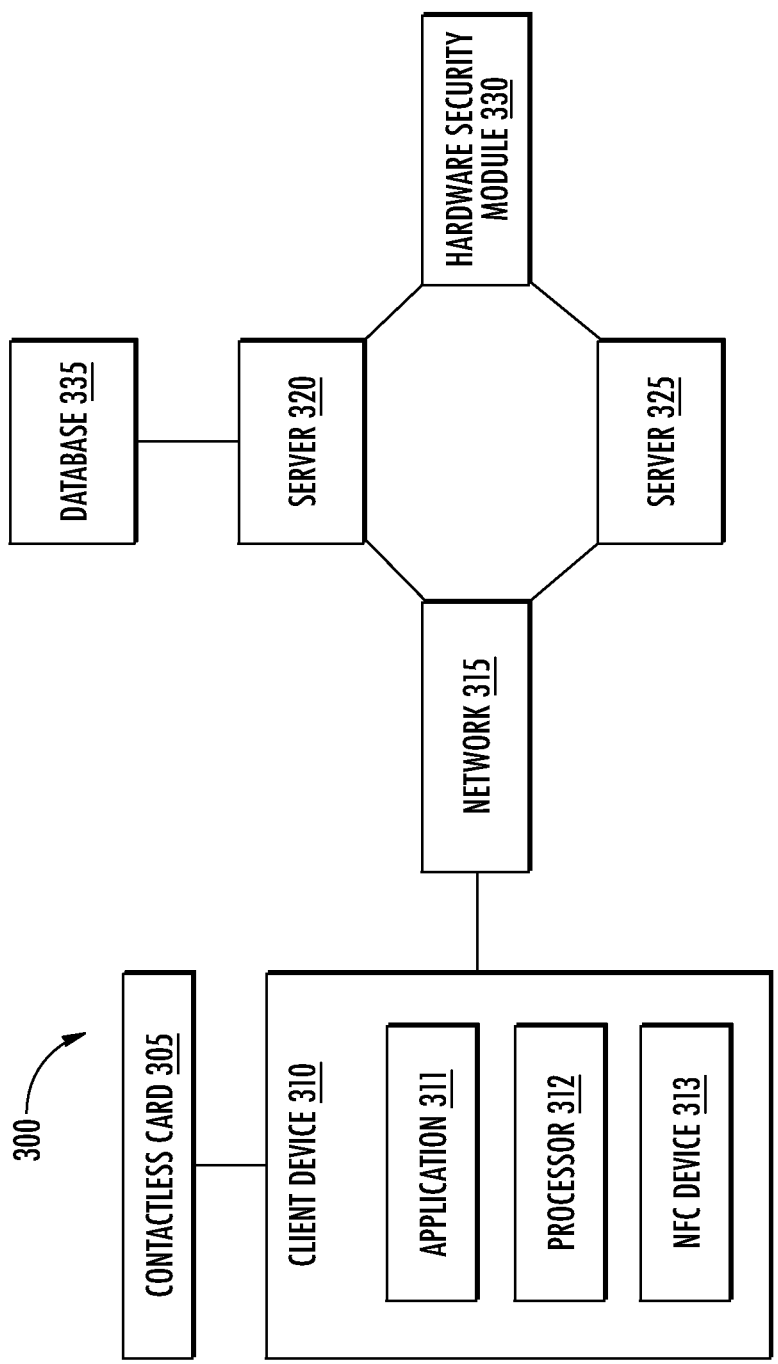
FIG. 3 is a diagram of a system using a contactless card according to an example embodiment.

FIG. 3 illustrates a system 300 using a contactless card. System 300 may include a contactless card 305, one or more client devices 310, network 315, servers 320, 325, one or more hardware security modules 330, and a database 335. Although FIG. 3 illustrates single instances of the components, system 300 may include any number of components.

System 300 may include one or more contactless cards 305, which are further explained with respect to FIGS. 2A-2B. In some examples, contactless card 305 may be in wireless communication, for example NFC communication, with client device 310. For example, contactless card 305 may include an NFC device 314 including one or more chips, such as a radio frequency identification chip, configured to communicate via NFC or other short-range protocols. In some embodiments, the contactless card 305 may be capable to communicate with client device 310 through other means including, but not limited to, Bluetooth, satellite, Wi-Fi, wired communications, and/or any combination of wireless and wired connections. According to some embodiments, contactless card 305 may be configured to communicate with an NFC device 313, e.g., initiator or a card reader, through NFC when contactless card 305 is within range of card reader 313.

In embodiments, the NFC Device 313 may be in an off or lower power state until the contactless card 305 is detected based on cellular communication. The NFC device 313 may exit the off or lower power state and communicate with the contactless card 305 to perform operations discussed herein.

System 300 may include client device 310, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 310 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 310 may be the same as, or similar to, a client device 110 as described with reference to FIG. 1A or FIG. 1B.

Client device 310 may be in communication with one or more servers 320 and 325 via one or more networks 315, and wired and/or wireless. Client device 310 may transmit, for example from an application 311 executing on client device 310, one or more requests to one or more servers 320 and 325. The one or more requests may be associated with retrieving data from one or more servers 320 and 325. Servers 320 and 325 may receive the one or more requests from client device 310. Based on the one or more requests from client device 310, one or more servers 320 and 325 may be configured to retrieve the requested data from one or more databases 335. Based on receipt of the requested data from the one or more databases 335, one or more servers 320 and 325 may be configured to transmit the received data to client device 310, the received data being responsive to one or more requests.

System 300 may include one or more hardware security modules (HSM) 330. For example, one or more HSMs 330 may be configured to perform one or more cryptographic operations as disclosed herein. In some examples, one or more HSMs 330 may be configured as special purpose security devices that are configured to perform the one or more cryptographic operations. The HSMs 330 may be configured such that keys are never revealed outside the HSM 330, and instead are maintained within the HSM 330. For example, one or more HSMs 330 may be configured to perform at least one of key derivations, decryption, and MAC operations. The one or more HSMs 330 may be contained within, or may be in data communication with, servers 320 and 325.

System 300 may include one or more networks 315. In some examples, network 315 may be one or more of a wireless network, a wired network or any combination of wireless network and wired network, and may be configured to connect client device 315 to server 320 and 325. For example, network 315 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 305 and client device 310 may comprise NFC communication, cellular network between client device 310 and a carrier, and Internet between the carrier and a back-end.

In addition, network 315 may include, without limitation, telephone lines, fiber optics, IEEE Ethernet 802.3, a wide area network, a wireless personal area network, a local area network, or a global network such as the Internet. In addition, network 315 may support an Internet network, a wireless communication network, a cellular network, or the like, or any combination thereof. Network 315 may further include one network, or any number of the exemplary types of networks mentioned above, operating as a stand-alone network or in cooperation with each other. Network 315 may utilize one or more protocols of one or more network elements to which they are communicatively coupled. Network 315 may translate to or from other protocols to one or more protocols of network devices. Although network 315 is depicted as a single network, it should be appreciated that according to one or more examples, network 315 may comprise a plurality of interconnected networks, such as, for example, the Internet, a service provider's network, a cable television network, corporate networks, such as credit card association networks, and home networks.

In various examples according to the present disclosure, client device 310 of system 300 may execute one or more applications 311, and include one or more processors 312, and one or more NFC devices 313, e.g. a card reader. For example, one or more applications 311, such as software applications, may be configured to enable, for example, network communications with one or more components of system 300 and transmit and/or receive data. It is understood that although only single instances of the components of client device 310 are illustrated in FIG. 3, any number of devices 310 may be used. As mentioned, the NFC device 313 may be configured to read from and/or communicate with contactless card 305. In conjunction with the one or more applications 311, NFC device 313 may communicate with contactless card 305.

The application 311 of any of client device 310 may communicate with the contactless card 305 using short-range wireless communication (e.g., NFC). The application 311 may be configured to interface with a NFC device 313 of client device 310 configured to communicate with a contactless card 305. As should be noted, those skilled in the art would understand that a distance of less than twenty centimeters is consistent with NFC range.

In some embodiments, the application 311 communicates through an associated reader (e.g., NFC device 313) with the contactless card 305.

In some embodiments, card activation may occur without user authentication. For example, a contactless card 305 may communicate with the application 311 through the NFC device 313 of the client device 310 through NFC. The communication (e.g., a tap of the card proximate the NFC device 313 of the client device 310) allows the application 311 to read the data associated with the card and perform an activation. In some cases, the tap may activate or launch application 311 and then initiate one or more actions or communications with an account server 325 to activate the card for subsequent use. In some cases, if the application 311 is not installed on client device 310, a tap of the card against the NFC device 313 may initiate a download of the application 311 (e.g., navigation to an application download page). Subsequent to installation, a tap of the card may activate or launch the application 311, and then initiate (e.g., via the application or other back-end communication) activation of the card. After activation, the card may be used in various transactions including commercial transactions.

According to some embodiments, the contactless card 305 may include a virtual payment card. In those embodiments, the application 311 may retrieve information associated with the contactless card 305 by accessing a digital wallet implemented on the client device 310, wherein the digital wallet includes the virtual payment card. In some examples, virtual payment card data may include one or more static or dynamically generated virtual card numbers.

Server 320 may comprise a web server in communication with database 335. Server 325 may comprise an account server. In some examples, server 320 may be configured to validate one or more credentials from contactless card 305 and/or client device 310 by comparison with one or more credentials in database 335. Server 325 may be configured to authorize one or more requests, such as payment and transaction, from contactless card 305 and/or client device 310.

Figure 4:
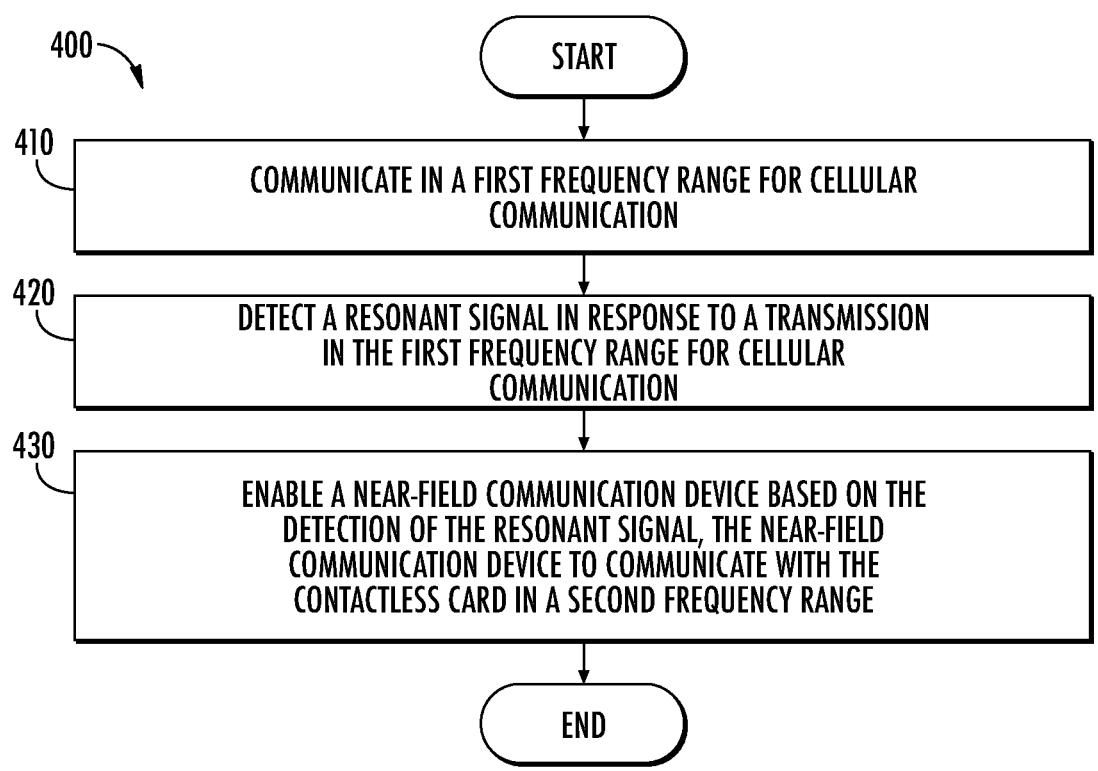
FIG. 4 illustrates an example of a first flow diagram.

FIG. 4 illustrates an example of a logic flow 400 that may be representative of some or all the operations executed by one or more embodiments described herein. For example, the logic flow 400 may illustrate operations performed by a client device.

At block 410, embodiments include communicating in a first frequency range for cellular communication. For example, the client device including a transceiver may communicate information and data with a cellular system in a cellular frequency range, which may be one of a 700 MHz frequency range, 800 MHz frequency range, a 850 MHz frequency range, a 1700 MHz frequency range, a 1900 MHz frequency range, a 2100 MHz frequency range, a 2300 MHz frequency range, a 2500 MHz frequency range, and a 2600 MHz frequency range.

At block 420, embodiments include detecting a resonant signal in response to a transmission in the first frequency range for cellular communication. In some instances, the resonant signal indicates the presence of a contactless card.

The resonant signal may be detected by a detection circuit based on a load on an amplifier of the transceiver.

At block 430, embodiments include enabling a near-field communication (NFC) device based on the detection of the resonant signal, the NFC device to communicate with the contactless card in a second frequency range. For example, the detection circuit may cause the NFC device to exit an off or lower power state and communicate in accordance with the NFC protocol. In embodiments, the first frequency range and the second frequency ranges may be different frequency ranges. For example, the NFC device may communicate with the contactless card in in the 13.56 MHz frequency range.

Figure 5:
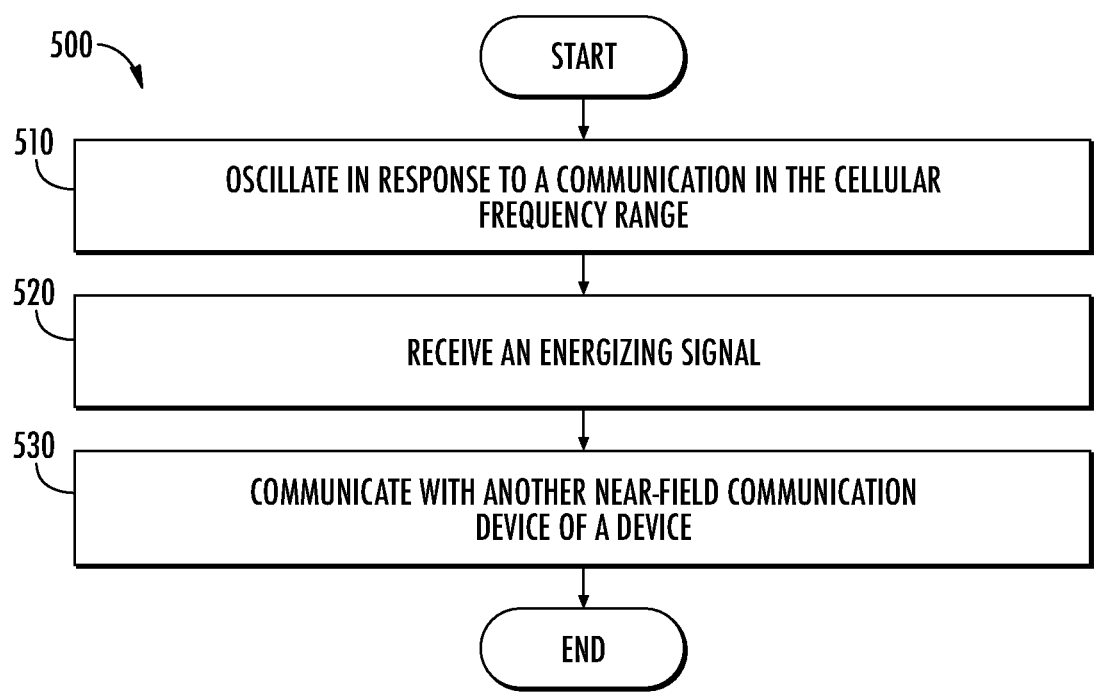
FIG. 5 illustrates an example of a second flow diagram.

FIG. 5 illustrates an example of a logic flow 500 that may be representative of some or all the operations executed by one or more embodiments described herein. For example, the logic flow 500 may illustrate operations performed by a contactless card.

At block 510, the logic flow 500 includes oscillating in response to a communication in the cellular frequency range. More specifically, a resonant circuit of a contactless card may oscillate or react when in the presence of a cellular communication signal creating a resonant frequency signal that may be detected by a detection circuit of another device, e.g., a client device.

In embodiments and at block 520 the logic flow 500 includes receiving an energizing signal. The energizing signal may be 'detected' and energize an NFC device of the contactless card, for example, and may be communicated by the NFC device of the client device in response to detecting the resonant frequency signal.

At block 530, the logic flow 500 includes communicating with another NFC device of device, e.g., the NFC device of the client device. In embodiments, the communication may include authentication exchange, and payment information, as described above. Embodiments are not limited in this manner.

Figure 6:
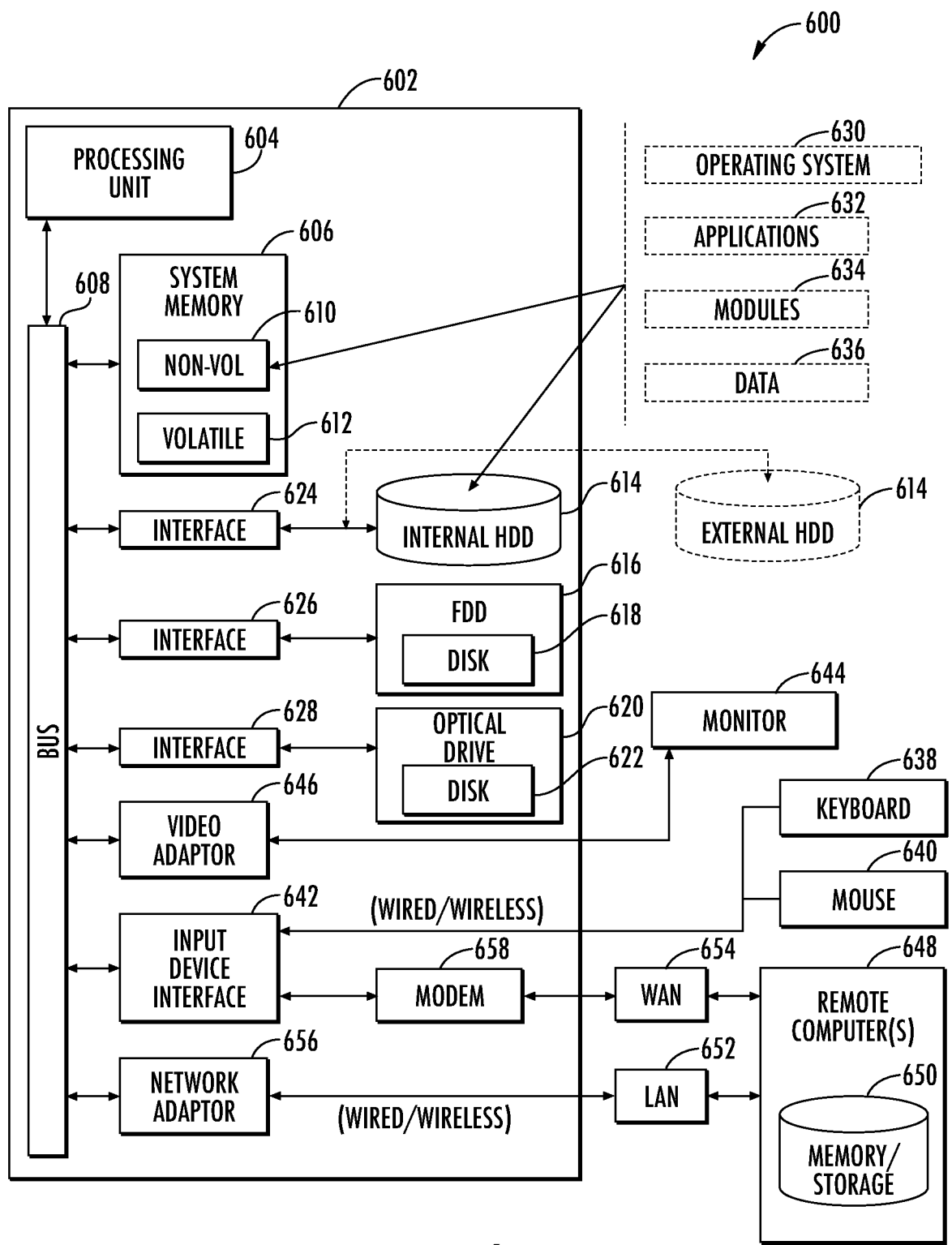
FIG. 6 illustrates an example of a computing architecture.

FIG. 6 illustrates an embodiment of an exemplary computing architecture 600 suitable for implementing various embodiments as previously described. In one embodiment, the computing architecture 600 may include or be implemented as part of system 100.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 700.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 604 through an input device interface 642 that is coupled to the system bus 608 but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1A-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 7:
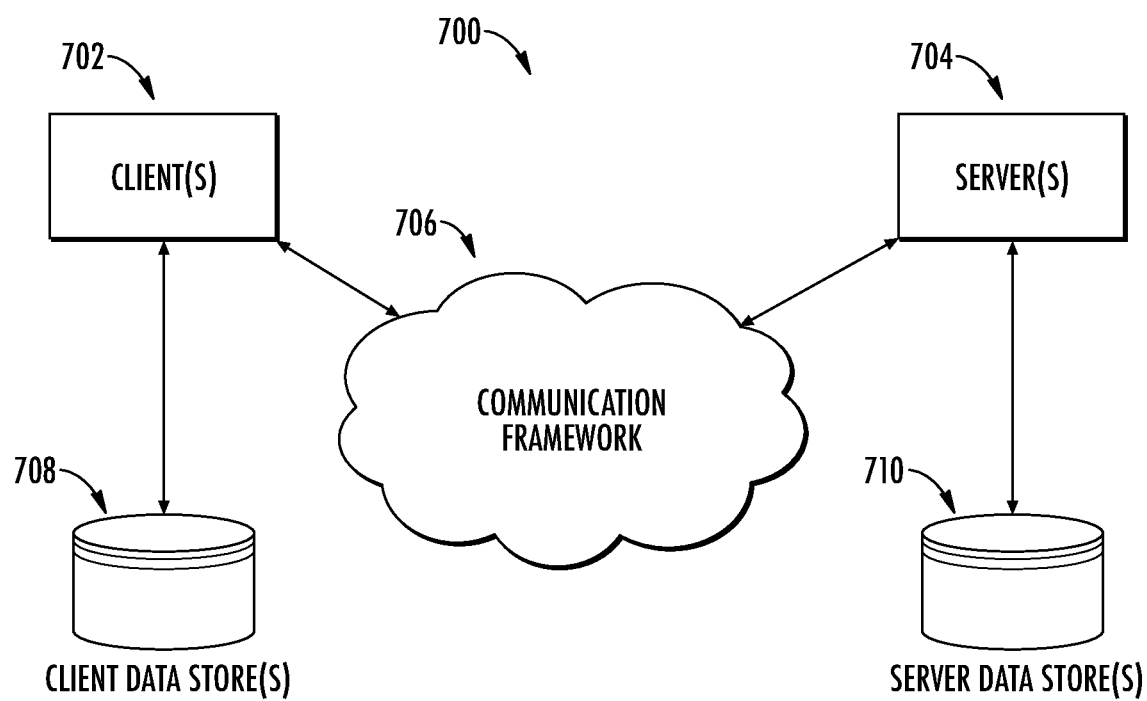
FIG. 7 illustrates an example of a communications architecture.

FIG. 7 is a block diagram depicting an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700, which may be consistent with system 100.

As shown in FIG. 7, the communications architecture 700 includes one or more clients 702 and servers 704. The servers 704 may implement one or more devices of FIGS. 1A and 1B. The clients 702 and the servers 704 are operatively connected to one or more respective client data stores 706 and server data stores 710 that can be employed to store information local to the respective clients 702 and servers 704, such as cookies and/or associated contextual information.

The clients 702 and the servers 704 may communicate information between each other using a communication framework 710. The communications framework 710 may implement any well-known communications techniques and protocols. The communications framework 710 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 710 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

What is claimed is:

1. A computing device, comprising:
memory configured to store instructions; and
processing circuitry coupled with the memory, the processing circuitry configured to execute the instructions, that when executed, cause the processing circuitry to:
determine a contactless card is within a near-field communication (NFC) communication range of the computing device based on a detection of a resonant signal, wherein the resonant signal is detected based on one or more communications communicated in a cellular frequency range;
cause a transceiver to transition from a lower power state to a higher power state to enable NFC communication with the contactless card; and
send, via the transceiver, one or more NFC communications to the contactless card.

2. The computing device of claim 1, wherein the lower state for the transceiver is an off state.

3. The computing device of claim 1, wherein the cellular frequency range comprises one of a 700 Megahertz (MHz), 800 MHz frequency range, a 850 MHz frequency range, a 1700 MHz frequency range, a 1900 MHz frequency range, a 2100 MHz frequency range, a 2300 MHz frequency range, a 2500 MHz frequency range, and a 2600 MHz frequency range, and the second frequency range comprising a 13.56 MHz frequency range.

4. The computing device of claim 1, wherein the resonant signal is detected based on a load detected on one or more of the transceiver, an amplifier associated with the transceiver, a cellular communications transceiver, an amplifier associated with the cellular communications transceiver, or any combination thereof.

5. The computing device of claim 4, comprising a detection circuit, and wherein the load is a detected by the detection circuit.

6. The computing device of claim 1, wherein the one or more NFC communications comprise data to perform an authentication, a transaction, or both.

7. The computing device of claim 5, wherein the data is comprised in a cryptogram.

8. The apparatus of claim 1, comprising a housing having a display, the transceiver, the circuitry, and the near-field communication device.

9. A computer-implemented method, comprising:
determining a contactless card is within a near-field communication (NFC) communication range of the computing device based on a detection of a resonant signal, wherein the resonant signal is detected based on one or more communications communicated in a cellular frequency range;
causing a transceiver to transition from a lower power state to a higher power state to enable NFC communication with the contactless card; and
sending, via the transceiver, one or more NFC communications to the contactless card.

10. The computer-implemented method of claim 9, wherein the lower state for the transceiver is an off state.

11. The computer-implemented method of claim 9, wherein the cellular frequency range comprises one of a 700 Megahertz (MHz), 800 MHz frequency range, a 850 MHz frequency range, a 1700 MHz frequency range, a 1900 MHz frequency range, a 2100 MHz frequency range, a 2300 MHz frequency range, a 2500 MHz frequency range, and a 2600 MHz frequency range, and the second frequency range comprising a 13.56 MHz frequency range.

12. The computer-implemented method of claim 9, wherein the resonant signal is detected based on a load detected on one or more of the transceiver, an amplifier associated with the transceiver, a cellular communications transceiver, an amplifier associated with the cellular communications transceiver, or any combination thereof.

13. The computer-implemented method of claim 12, wherein the load is a detected by a detection circuit.

14. The computer-implemented method of claim 9, wherein the one or more NFC communications comprise data to perform an authentication, a transaction, or both.

15. The computer-implemented method of claim 9, wherein the data is comprised in a cryptogram.

16. A non-transitory computer-readable storage medium, the computer-readable storage medium including instructions that when executed by circuitry, cause the circuitry to:
  determine a contactless card is within a near-field communication (NFC) communication range of the computing device based on a detection of a resonant signal, wherein the resonant signal is detected based on one or more communications communicated in a cellular frequency range;
  cause a transceiver to transition from a lower power state to a higher power state to enable NFC communication with the contactless card; and
  send, via the transceiver, one or more NFC communications to the contactless card.

17. The non-transitory computer-readable storage medium of claim 16, wherein the lower state for the transceiver is an off state.

* * * * *